United States Patent [19]

Cantor et al.

[11] 3,728,449

[45] Apr. 17, 1973

[54] GERMICIDAL IODINE COMPOSITIONS FOR APPLICATION TO SKIN TISSUE INCLUDING TEATS OF MILK ANIMALS

[75] Inventors: Abraham Cantor, Elkins Park, Pa.; Murray W. Winicov, Flushing, N.Y.

[73] Assignee: West Laboratories, Inc., Long Island City, N.Y.

[22] Filed: May 1, 1972

[21] Appl. No.: 249,096

Related U.S. Application Data

[63] Continuation of Ser. No. 832,482, June 11, 1969, abandoned.

[52] U.S. Cl. ................................................424/150
[51] Int. Cl. ...............................................A61k 27/00
[58] Field of Search.....................................424/150

[56] References Cited

UNITED STATES PATENTS 3,028,299  4/1962  Winicov et al. ......................424/150
3,285,816  11/1966  Kaplan et al. ........................424/150

Primary Examiner—Sam Rosen
Attorney—Howard E. Thompson, Jr. et al.

[57] ABSTRACT

An improved germicidal-iodine composition for application to skin tissue and particularly to teats of milk animals in the control of mastitis, wherein an aqueous nonionic carrier-iodine composition providing available iodine concentration in the range of about 0.25 to 2 percent, and containing nonionic carriers of the types which have been cleared for use in contact with food equipment in an amount providing a ratio of carrier to available iodine within the range of 5:1 to 20:1, is supplemented by an emollient in the form of a water-soluble polyhydric alcohol or ethoxylated lanolin, and the emollient is protected against reaction with the iodine by providing a suitably high distribution coefficient for the iodine and maintaining a pH in the composition in the range of about pH 3 – 6.5, and preferably buffered at about pH 3.5 – 4.5. Buffering can be effected by various food acids and salts of food acids.

12 Claims, No Drawings

GERMICIDAL IODINE COMPOSITIONS FOR APPLICATION TO SKIN TISSUE INCLUDING TEATS OF MILK ANIMALS

This application is a continuation of prior application Ser. No. 832,482, filed June 11, 1969 now abandoned.

BACKGROUND OF THE INVENTION

The application of nonionic carrier-iodine compositions to skin tissue with the intention of leaving residual deposits on the skin for indefinite periods, while theoretically practical due to the complexing and slow release of iodine in such compositions, has been seriously curtailed in actual practice, due apparently to the skin drying and/or irritating effect which can result from extended contact with nonionic carrier-iodine compositions. In spite of this limitation, however, there has been extensive use of nonionic carrier iodine compositions for application to skin tissue in the form of teat dips which have been found highly effective in controlling and preventing the spread of mastitis in dairy herds and the like. By way of illustration, dipping of cows' teats in an aqueous nonionic carrier-iodine solution containing 1 percent available iodine immediately after each milking can virtually eliminate the spread of mastitis. This dipping of the teats leaves a film deposit which dries on the teats, and after extended periods of use, there may be noticeable drying and cracking of the skin which occasionally becomes sufficiently serious to require discontinuance of the teat dipping and/or separate treatment to counteract the irritation. It has also been observed that such irritation of the teats can interfere with milking operations in the form of slower milking and dropping of the milking units.

The control of mastitis is one of the major problems which confronts the dairy industry, and nonionic carrier-iodine compositions as teat dips for providing such control have been so effective that the use of such compositions has been expanding rapidly, in spite of the possibilitites of irritation and interference with milking which may be experienced as above described. There is, however, a distinct need for iodine teat dip compositions which can provide the desired effectiveness in the control of mastitis without bringing about secondary problems of teat irritation and interference with milking.

THE INVENTION

It has now been discovered in accordance with the present invention that all of the advantages of nonionic carrier-iodine compositions as teat dips for the control of mastitis can be maintained while substantially eliminating the problem of teat irritation and the resulting interference with milking by incorporating in such compoistions emollient in the form of about 5 to 25 percent, and preferably about 10 percent by weight based on the total weight of such composition, of a water soluble polyhydric alcohol, 1 to 10% and preferably about 2 to 3 percent of water soluble ethoxylated lanoline, as well as mixtures thereof including mixed polyhydric alcohols and polyhydric alcohol-ethoxylated lanolin mixtures.

Any of the commercially available polyhydric alcohols having recognized emollient characteristics can be employed in compositions of the invention. These polyhydric alcohols are water soluble compounds consisting of carbon, hydrogen, and oxygen and contain 2–6 hydroxy groups and may also contain either linkages but which are not utilized or recognized by the skilled artisan as "detergents." Illustrative of such polyhydric alcohols are di-, tri-propylene glycols and the like, di-, tri-, tetra-ethylene glycols and the like, hexylene glycol (2-methyl-2, 4-pentanediol), 1,2; 1,3; 1,4 and 2,3 butylene glycols, pentamethylene glycol, hexamethylene glycol, glycerin, propylene glycol, and the hexitols such as mannitol, sorbitol and the like. Typical polyhydric alcohols, preferred from the standpoint of cost and availability, include glycerin, propylene glycol, and the hexitols such as mannitol, sorbitol and the like. As used throughout the specification and claims, therefore, the term "polyhydric alcohols" should be understood as embracing the foregoing description.

It is recognized that these emollients have been used in other type preparations, and it might, on casual consideration, seem obvious to incorporate such emollients in nonionic carrier-iodine compositions. In actual practice, however, the inclusion of such emollients is not obvious, and in fact is contraindicated by the relatively high degree of reactivity between such emollients and halogens. Chlorine, for example, is highly reactive with such polyhydric alcohols, and iodine, while somewhat less reactive, is still sufficiently reactive to create a serious product stability problem.

It has now been found, however, that reactivity of iodine with such emollients can be checked in a sufficiently effective way to enable preparation of stable products by so formulating nonionic carrier-iodine compositions as to suitably control the pH and iodine complexing. Products that have a pH of 2.5 or less are positively unsatisfactory due to the skin irritation which would result from this much acid, while a pH approaching neutrality or higher leads to substnatial reaction of iodine with the emollient. A satisfactory pH for the new composition should fall within the range of pH 3 – 6.5 and preferably within the range of about 3.5 to 4.5; and in order to hold the composition in the desired pH range, it is preferable to buffer the composition, suitable buffering agents including any of the food acids and salts thereof such as lactic acid, citric acid, sorbic acid, malic acid, fumaric acid, phosphoric acid, and salts thereof.

Another factor influencing the iodine-emollient stability is the degree of iodine complexing by the nonionic carrier. Iodine complexing will vary from one nonionic carrier to another and, in most instances, it is desirable to formulate the composition to include inorganic iodide in combination with elemental iodine to thereby enhance the iodine distribution coefficient.

Distribution coefficient (D.C.) is a measure of iodine complexing originally described in U. S. Pat. No. 3,028,299, and is determined by distribtuion of iodine between an aqueous phase and a non-aqueous phase comprising purified n-heptane. The test procedure as disclosed in said patent involved adding 1.00 ml. of standardized test solution containing between about 0.05 and 5.0 percent iodine to a 50 ml. graduated cylinder containing 25 mls. purified n-heptane. The temperature of the heptane is brought to 25±1°C. The cylinder is stoppered and shaken vigorously by hand for 1 minute during which time the aqueous solution suspends in the heptane as a uniform haze. The solution is then allowed to stand a minute or two, and the temperature adjustment and shaking are repeated. For best results the solution should settle for an hour, although only a minute or two are necessary if centrifuged.

The amount of iodine in the heptane layer can be determined colorimetrically at 520 mu the absorption peak; the relationship between light absorption and iodine concentration in this solvent is linear throughout the range 1 to 25 mg. per 100 mls. The distribution coefficient is calculated by the following formula:

$$D.C. = \frac{mg.\ I\ remaining\ in\ aq.\ phase}{mg.\ I\ in\ heptane} \times \frac{mls.\ heptane}{mls.\ aq.\ phase}$$

Using the Beckman colorimeter with 1.00 cm. cells an absorption of 0.142 corresponded to 1.00 mg. iodine extracted by 25. mls. heptane. Values so obtained are readily reproducible to within 10 percent, and frequently to within 1 percent.

The D.C. values required to prevent objectionable reaction of iodine with the polyhydric substance will vary, with variations in the percent available iodine in a composition, the minimum D.C. value being about 37 for a 0.5 percent available iodine composition and 75 or 150 for 1 percent or 2 percent available iodine compositions, respectively. For intermediate iodine concentrations, the minimum D.C. value can be determined according to the formula:

D.C. number/Percent available iodine = at least 75

A primary reason for maintaining of a D.C. value in excess of the lower limits above mentioned is to assure a sufficient complexing of the iodine so that there is no build-up of iodine in the cows' milk or body fluids such as would be caused by external contact with uncomplexed iodine.

The enhancement of iodine complexing with nonionic carriers by employing iodine in association with an inorganic iodide providing a source of iodide (I-) has been disclosed in U.S. Pat. No. 3,028,299, the indication there being that the at least 0.25 parts of iodide (I-) should be present per part of iodine. In the compositions of the present invention, it has been found that there is special advantage to employing at least 0.35 parts of iodide for each part of elemental iodine present since this will so protect the iodine that stability of the iodine-emollient system will be maintained even if the pH is as high as pH 6.5.

As may have been gathered from the foregoing, the preparation of satisfactory compositions in accordance with the present invention involves the prevention of a pH lowering effect which results from reaction between iodine and emollient by either suitably buffering to stabilize an adjusted pH, by insuring sufficiently high iodine complexing to minimize its availability for reaction with emollient, and preferably by employing both buffering and enhanced iodine complexing through addition of inorganic iodide. By way of illustration, a composition prepared by a commonly used procedure of heating elemental iodine with detergent to effect initial complexing, will generally have about 0.2 parts of iodide present for each part of elemental iodine due to reaction with the detergent. Simple adjustment of such a composition to a pH within the range of 3– 6.5 cannot provide a satisfactory product, since reaction of the unprotected iodine with emollient will cause a rapid dropping of the pH to a point significantly below pH 3.

Such unsatisfactory product could be converted to an acceptable product by buffering to prevent such drop in pH, but the product would not have the special advantages which are achieved in a product which is both buffered and provided with an iodide:iodine ratio of at least 0.35:1.

The amount of buffering salts may vary over a wide range, the amount necessary being generally inversely related to the amount of iodide used in the composition. The more iodide used, the less buffer needed. Since the several acid-salt mixtures have varying molecular weights, it is best to describe the amount of buffer needed in terms of molarity rather than percent. We have found that about 0.02 – .25 molar buffer content is optimum. It is preferable to use only enough to maintain the pH in the desired range, since high salt content may adversely affect the homogeneity of the solutions, especially at elevated temperature, such as 50°C, and at low temperature, such as 0°C.

When buffering agent is added in the form of the acid, and/or when other acidic components may be present such as hydriodic acid introduced by an HI-I$_2$ concentrate, the pH adjustment can be effected by addition of appropriate amount of alkali such as sodium hydroxide.

In summary, therefor, the emollient is protected from reaction with iodine by providing in the solution a sustained pH of about pH 3 – 6.5 and a distribution coefficient sufficiently high to satisfy the formula:

D.C. number/Percent available iodine = at least 75.

The nonionic carriers suitable for use in the compositions include all of the known nonionic carriers or complexing agents for iodine, but the preferred carriers are the ethoxylated nonionic detergent types which have been cleared for use in contact with food equipment. Suitable nonionic carriers include:

a. alkyl phenol ethylene oxide condensates wherein the alkyl group contains 8-12 carbon atoms and the condensate contains about 7-18 mols of ethylene oxide per mol of alkyl phenol.

b. nonionics of the type disclosed in U.S. Pat. No. 2,759,869 and generally embraced by the formula:

$$HO(C_2H_4O)_x(C_3H_6O)_y(C_2H_4O)_{x'}—H$$

wherein y equals at least 15 and $(C_2H_4O)x + x'$ equals 20 to 90 percent of the total weight of said compound.

c. nonionics which are ethoxylated partial esters of fatty acids with sugar alcohols such as sorbitol and suitably those containing an average of 1-3 ester groups and up to 50 mols of ethylene oxide per molecule.

d. butoxy derivatives of polypropylene oxide, ethylene oxide, block polymers having molecular weights within the range of about 2,000 – 5,000.

e. poly (N-vinyl-2-pyrrolidone) (P.V.P.), and f. mixtures thereof.

Typical nonionic carriers falling within these types which are commercially available, and some of which are utilized in the examples hereinafter appearing, include the following nonionic detergents:

"Igepal CO-630" = nonyl phenol condensed with 9 – 10 mols of ethylene oxide

"Igepal CO-710" = nonyl phenol condensed with 10 – 11 mols of ethylene oxide

"Igepal CO-730" = nonyl phenol condensed with 15 mols of ethylene oxide

"Pluronic L62" = 25 to 30 mols of polyoxypropylene condensed with 8.5 to 10.2 mols of ethylene oxide "Pluronic F68" = 25 to 30 mols of polyoxypropylene condensed with 33 to 41 mols of ethylene oxide "Pluronic P85" = 36 to 43 mols of polyoxypropylene condensed with 48 to 52 mols of ethylene oxide "Tween 21" = polyoxyethylene (4) sorbitan monolaurate "Tween 40" = polyoxyethylene (20) sorbitan monopalimitate "Tergitol XH" = butoxy monoether of mixed (ethylene-propylene) polyalkylene glycol having a cloud point of 90°–100° C and an average molecular weight of 3,300.

The referred manner of introducing iodine in association with iodide is to employ an aqueous concentrate containing about 57 percent by weight $I_2$ and 20 percent by weight HI, or 24 percent by weight NaI. This will provide approximately the minimum ratio of 0.35 parts of iodide (I⁻) per part of iodine perviously indicated to be important, and when a somewhat higher ratio may be desired, the separate hydriodic acid or sodium iodide can be incorporated in the formulation.

Since the compositions are intended for use as initially prepared or without dilution, it is important that the viscosity should be relatively low, as excessive viscosity will cause too heavy a deposit of composition as the teats are dipped. An upper limit for viscosity would be about 200 cps. (Brookfield), and satisfactory products will generally have viscosities in the range of 2–10. A primary factor in determining the viscosity of the final composition is the amount and particular selection of nonionic carrier employed, and any formulation which would be satisfactory but for having too high a viscosity, could readily be modified to provide a lower viscosity by slight change in the amount of selection of nonionic carrier.

In formulating the new compositions, the buffering agent and a portion of the water which will make up the composition are placed in a large mixing tank. In a separate smaller mixing tank, a portion of the nonionic carrier and HI-$I_2$ or NaI-$I_2$ concentrate are mixed together and then diluted with an additional portion of the water which is to make up part of the composition. The balance of the nonionic carrier is then added followed by the glycerine or other emollient. After thorough mixing, the contents of the smaller tank are added with thorough mixing to the solution of buffering agent in the larger tank. Additional hydriodic acid or NaI is then added, if desired, and the pH is adjusted by addition of sodium hydroxide. A final aliquot of water is then added to provide final adjustment of the available iodine level to that desired in the composition. It will be seen from the foregoing that the complexing of iodine with the nonionic carrier and the blending of emollient with this complex is accomplished before the system is brought under the influence of the buffering agent.

The following examples show the preparation of typical nonionic carrier-iodine compositions with emollient incorporated therein in a manner to be protected from reaction with the iodine in accordance with the present invention, as well as some related but unsatisfactory compositions for comparative purposes, but it is to be understood that these examples are given by way of illustration and not of limitation.

EXAMPLE I

A number of aqueous detergent-iodine compositions were prepared containing by weight:

Igepal CO-720 4.7 %
Pluronic P-85 4.9 %
Iodine 1.18%
Sodium Iodide .60% as well as amounts of glycerin and/or buffering agent as indicated in the following tabulation. These compositions were adjusted to the particular pH levels indicated in the following tabulation by addition of required amounts of sodium hydroxide, and the available iodine concentration of the initially prepared compositions was determined. After storage for one day at 50°C, the pH and available iodine concentration were again determined for each composition, and these values are included in the following tabulation:

| Added Component | A | B | C | D | E | F | G | H |
|---|---|---|---|---|---|---|---|---|
| % glycerin | 10. | 10. |  | 10. |  | 10. |  | 10. |
| % Lactic Acid |  | 0.25 |  |  |  |  |  |  |
| Phos. Acid |  |  | 1.0 | 1.0 | 1.0 | 1.0 | 1.0 | 1.0 |
| pH Initial | 3.5 | 6.0 | 6.5 | 6.5 | 7.0 | 7.0 | 8.0 | 8.0 |
| 1 day 50°C | 3.5 | 3.0 | 6.5 | 6.5 | 7.0 | 6.9 | 7.7 | 7.1 |
| % Avail.$I_2$ Initial | 1.18 | 1.18 | 1.18 | 1.18 | 1.18 | 1.18 | 1.18 | 1.18 |
| 1 day 50°C | 1.14 | 1.14 | 1.14 | 1.12 | 1.14 | 1.05 | 1.11 | 0.90 |

It should be noted that the greatest amount of reactivity of iodine with emollient takes place within the first day following preparation of a composition. Thus, the iodine loss and pH change after storage for one day at 50°C (122°F) provides a practical measure of iodine stability.

Example A shows a preferred composition, buffered within the preferred range of 3 – 6.5, using close to a minimum of buffer, which is pH stable after being stored for 1 day at 50°C, and which shows the slight (insignificant) loss of available iodine which is characteristic of most iodine preparations on storage at 50°C.

Example B shows a composition without any buffering, but since it has an iodide to iodine ratio of over 0.35:1, it remains within the preferred pH range. Although not shown here, similar preparations with a ratio of iodide to iodine of 0.2:1, gave a pH reading of 2.5 after atorage at 50°C for 1 day.

Examples C and D are a pair of compositions buffered at pH 6.5, in which there is the beginning of an adverse effect of pH on the reactivity of iodine with emollient. At pH 7, (Examples E and F) the adverse effect is pronounced, and the resulting product F is considered to be unstable. Examples G and H show how the situation gets increasingly worse with higher pH.

The adverse effect of high pH which is so clearly demonstrated for glycerin in the foregoing tabulation is characteristic of the adverse effect of high pH on nonionic carrier-iodine compositions containing any of the emollients earlier described in the specification.

EXAMPLE II

Four different nonionic carrier-iodine compositions containing emollient were prepared containing nonionic carrier, iodine, iodide, emollient and buffering agent in the amounts (% by weight) shown in the following table, and pH in each instance was adjusted by addition of sodium hydroxide to the initial pH shown in the tabulation and the resulting compositions show the respective initial available iodine contents as indicated.

|  | A | B | C | D |
|---|---|---|---|---|
| Tergitol XH |  |  |  | 10 |
| Igepal CO-720 |  | 15 |  |  |
| Pluronic P65 | 10 |  | 6 |  |
| Tween 40 |  | 5 | 4 |  |
| Iodine | 0.75 | 2.0 | 0.5 | 0.25 |
| Sodium Iodide | 0.40 | 1.0 | 0.5 | 0.50 |
| Glycerin | 2.5 |  | 20 |  |
| Sorbitol |  | 5 |  |  |
| Propylene glycol |  |  |  | 10 |
| Malic acid |  |  |  | 0.5 |
| Citric acid |  | 0.5 | 0.5 |  |
| Fumaric acid | 00.20 |  |  |  |
| Water to 100% | x | x | x | x |
| Initial pH | 5.0 | 4.0 | 6.5 | 3.5 |
| Initial avail. $I_2$ | 0.75 | 1.95 | 0.5 | 0.25 |

Each of these compositions exhibits satisfactory iodine stability and shows no significant change in pH upon storing for 1 day at 50°C.

EXAMPLE III

The procedure of Example II was repeated preparing four additional compositions employing a different iodide and different selections of nonionic carrier, emollient and buffering agent as indicated in the following tabulation:

|  | A | B | C | D |
|---|---|---|---|---|
| Pluronic P123 | 10 | 5 |  | 5 |
| Pluronic F68 |  | 5 |  |  |
| Igepal CO-710 |  |  | 10 |  |
| Tween 21 |  |  | 5 | 7 |
| Iodine | 1.0 | 0.75 | 1.5 | 1.25 |
| Potassium Iodide | 0.8 | 0.4 | 0.7 | 0.8 |
| Mannitol | 10 |  |  | 5 |
| Ethoxylated Lanolin |  | 2 |  |  |
| Glycerin |  | 10 | 15 | 10 |
| Sorbic Acid |  |  | 0.4 |  |
| Lactic Acid | 0.3 | 0.25 |  | 0.5 |
| Water to 100% | x | x | x | x |
| Initial pH | 3.0 | 4.0 | 5.0 | 6.0 |
| Initial avail. $I_2$ | 1.0 | 0.75 | 1.45 | 1.20 |

Here again, each of the compositions shows satisfactory iodine stability and no significant change in pH after storage for 1 day at 50°C.

EXAMPLE IV

The procedure of Example II was repeated preparing two additional compositions employing PVP alone and in combination with a nonionic detergent as the nonionic carrier and employing individual and mixed emollients with different amounts of iodine, iodide and buffering agent as indicated in the following tabulation:

|  | A | B |
|---|---|---|
| PVP | 5% | 3% |
| Pluronic P-85 |  | 5% |
| Iodine | 1 | 0.75 |
| Sodium Iodide | 0.6 | 0.5 |
| Glycerin | 10 | 5 |
| Propylene Glycol |  | 5 |
| Citric Acid | 0.5 |  |
| Lactic ACid |  | 0.5 |
| Water to 100% | x | x |
| Initial pH of composition | 4.5 | 4.0 |
| Initial % avail. $I_2$ | 1.0 | 0.75 |

These compositions show satisfactory iodine stability and no significant change in pH after storage for one day at 50°C.

Various changes and modifications in the improved nonionic carrier-iodine compositions herein disclosed may occur to those versed in the art in the light of the foregoing disclosure; and to the extent that such changes and modifications are embraced by the appended claims, it is to be understood that they constitute part of the present invention.

What is claimed:

1. A germicidal composition for application to skin tissue and particularly to teats of milk animals in the control of mastitis, said composition consisting essentially of an aqueous solution containing available iodine in the amount of about 0.25 to 2% by weight, said iodine being complexed with a water soluble ethoxyl containing nonionic detergent iodine carrier in an amount to provide a ratio of carrier to available iodine within the range of 5:1 to 20:1, an emollient selected from the group consisting of pohydric alcohols, water soluble ethoxylated lanolin, and mixtures thereof, said polyhydric alcohols being present in an amount of about 5 to 25 percent of said composition and said water soluble ethoxylated lanolin being present in an amount of about 1 to 10 percent of said composition, said solution having a sustained pH in the range of about pH 3 – 6.5 and containing sufficient inorganic iodide to provide a distribution coefficient sufficiently high to satisfy the formula:

D.C. number/Percent available iodine = at least 75, said pH range and said distribution coefficient serving to prevent said emollient from reacting with said available iodine.

2. A germicidal composition as defined in claim 1 wherein said polyhydric alcohols are members selected from the group consisting of glycerin, propylene glycol, mannitol, sorbitol, and mixtures thereof.

3. A germicidal composition as defined in claim 1 wherein said available iodine is present as elemental iodine in association with a water soluble inorganic iodide in an amount to provide at least 0.35 parts by weight of iodide (I⁻) per part by weight of iodine.

4. A germicidal composition as defined in claim 1 wherein said sustained pH is provided by buffering agents comprising any of the recognized food acids and mixtures thereof.

5. A germicidal composition as defined in claim 4 wherein the quantity of buffering agent is such as to provide a 0.02 – 0.25 molar buffer content, and the pH is buffered within the range of pH 3.5 to 4.5.

6. A germicidal composition as defined in claim 1 wherein the emollient is a polyhydric alcohol and is present in the amount of about 10 percent by weight.

7. A germicidal composition as defined in claim 6 wherein the emollient is glycerin.

8. A germicidal composition as defined in claim 6 wherein the emollient is sorbitol.

9. A germicidal composition as defined in claim 6 wherein the emollient is propylene glycol.

10. A germicidal composition as defined in claim 6 wherein the emollient is mannitol.

11. A germicidal composition as defined in claim 1 wherein the emollient is ethoxylated lanolin and is present in the amount of about 2 to 3 percent by weight.

12. A germicidal composition for application to skin tissue and particularly to teats of milk animals in the control of mastitis, said composition consisting essentially of an aqueous solution containing available iodine in the amount of about 0.25 to 2 percent by weight, said iodine being complexed with a nonionic iodine carrier selected from the group consisting of a. alkyl phenol ethylene oxide condensates wherein the alkyl group contains 8–12 carbon atoms and the condensate contains about 7–18 mols of ethylene oxide per mol of alkyl phenol, b. nonionics embraced by the formula:

$$HO(C_2H_4O)_x(C_3H_6O)_y(C_2H_4O)_{x'}-H$$

wherein $y$ equals at least 15 and $(C_2H_4O)_{x+x'}$ equals 20 to 90 percent of the total weight of said compound, c. nonionics which are ethoxylated partial esters of fatty acids with sugar alcohols containing an average of 1 – 3 ester groups and up to 50 mols of ethylene oxide per molecule, d. butoxy derivatives of polyethylene oxide, ethylene oxide, block polymers having molecular weights within the range of about 2,000 – 5,000, e. poly(N-vinyl-2-pyrrolidone), and f. mixtures thereof, said iodine carrier being present in an amount to provide a ratio of carrier to available iodine within the range of 5:1 to 20:1, an emollient selected from the group consisting of polyhydric alcohols, water soluble ethoxylated lanolin, and mixtures thereof, said polyhydric alcohols being present in an amount of about 5 to 25 percent of said composition and said water soluble ethoxylated lanolin being present in an amount of about 1 to 10 percent of said composition, said solution having a sustained pH in the range of about pH 3 – 6.5 and containing sufficient inorganic iodide to provide a distribution coefficient sufficiently high to satisfy the formula:

D.C. number/Percent available iodine = at least 75, said pH range and said distribution coefficient serving to prevent said emollient from reacting with said available iodine.

* * * * *